Dec. 27, 1955     H. F. FISCHER     2,728,877
APPARATUS FOR OBTAINING EXTREMELY HIGH TEMPERATURES
Filed June 19, 1951
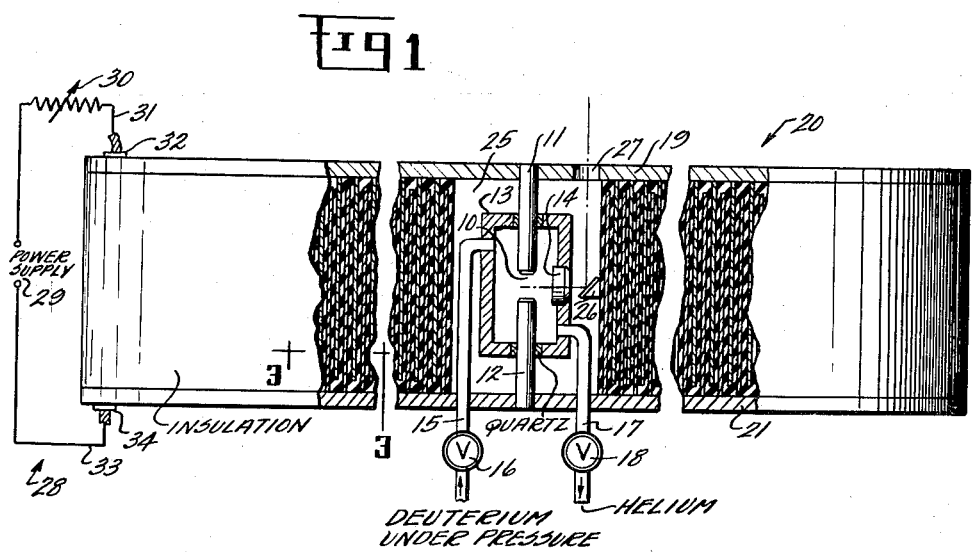
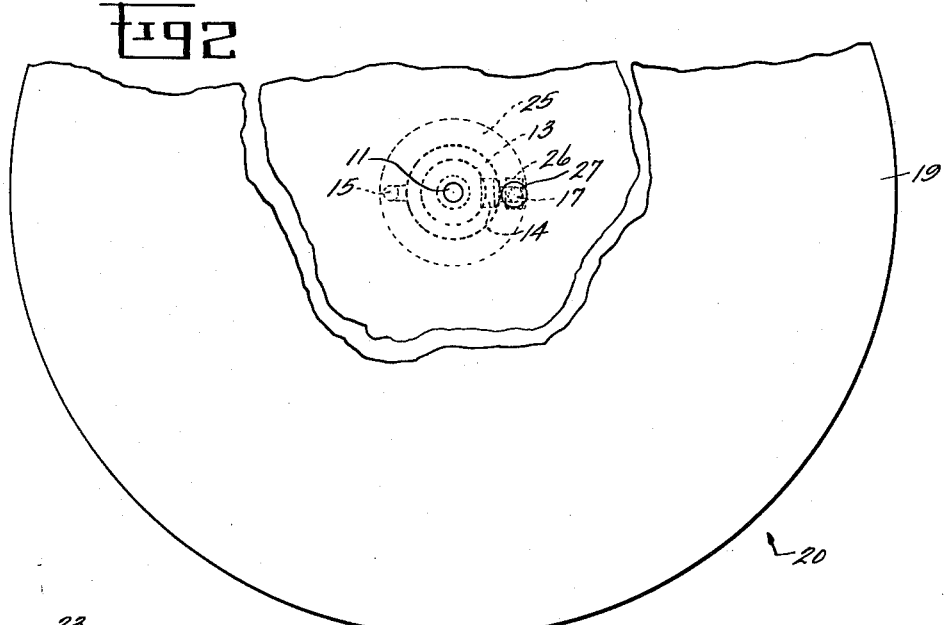
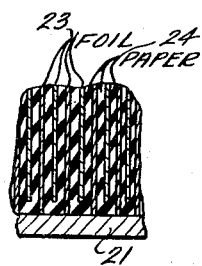
INVENTOR.
HEINZ FISCHER
BY Wade Koontz
Chester Tietig
ATTORNEYS

United States Patent Office 2,728,877
Patented Dec. 27, 1955

2,728,877

APPARATUS FOR OBTAINING EXTREMELY HIGH TEMPERATURES

Heinz F. Fischer, Belmont, Mass.

Application June 19, 1951, Serial No. 232,435

2 Claims. (Cl. 315—111)

(Granted under Title 35, U. S. Code (1952), sec. 266)

The invention described herein may be manufactured and used by or for the Government for governmental purposes without payment to me of any royalty thereon.

This invention relates to method and apparatus for obtaining temperatures which are higher than any heretofore known to have been obtained terrestrially excluding the atomic bomb. The temperatures obtained are of very short duration which is however long enough to be valuable for the initiation of certain reactions which may be nuclear or molecular. The high temperature peak can be re-attained after an interval which may be extremely short.

The method therefore, is suitable for the production of intense heat pulses which may be used for a large variety of purposes, for example infra-red signalling, the initiation of nuclear and other reactions, the melting of refractory and other substances and the vaporization of metals.

Briefly stated, the method comprises building up a direct current charge on a capacitor and discharging the capacitor through a gap which is surrounded by a small to medium size chamber in which there is an optical window. This window is preferably made of lithium fluoride, but other known good conductors of optical radiation may be substituted. Within the chamber there are of course the electrodes, which may be made of platinum or other high melting metal. Surrounding the gap there is an atmosphere which may be any of the molecular or atomic forms of hydrogen or argon. This atmosphere is held at a pressure range from 100 p. s. i. to 100 atmospheres. Preferably the atmosphere is constantly being renewed by an influent stream, the altered, actuated gas or vaporized reaction product being removed constantly as effluent. The capacitor and circuit are built to have an absolute minimum of inductance so as to shorten the discharging time.

An intense radiation is transmitted through the optical window onto an angled metallic mirror mounted closely adjacent that side of the window from which the high temperature is radiated. Reflection from the mirror takes place and is transmitted according to the angle of the mirror to a point outside of the capacitor where it may be put to such use as is desired. The sphere of the reaction which the high temperature is to trigger is of course placed as close to the capacitor as possible without deteriorating the capacitor. The preferred apparatus is one in which the capacitor surrounds the spark gap and spark chamber and in which there are no wires necessary to complete the circuit. In a modified form of the invention metal wires of thin cross section and rather high resistance may be stretched between the electrodes of the spark gap for the purpose of furnishing the vapors of certain metals, for example, the equivalents: beryllium, thorium, molybdenum and uranium, which may find application for thermonuclear purposes. This necessitates a somewhat altered electrical arrangement as evidenced by the well known technique of exploding wires.

This invention is based on experimental observation of the present inventor and M. Reger that in short are high-energy spark discharges (H. Fischer and M. Reger, "Time function of the radiation of short sparks," Wright Field Report No. T-TR-1178) there is a time lag of about 0.3–0.5 microsecond or more between the time of the energy maximum in the spark channel and between the time of its radiation maximum. Consequently, considerable energy starts to flow out of the spark channel after the electrical breakdown is practically finished. This means that the energy which is fed into the spark during the electrical breakdown is stored in the spark channel for a time interval. $\Delta t$, which, depending upon the test conditions, may amount up to about 0.3–0.5 microsecond or more, since all other processes which may carry energy out of the spark channel are slow in comparison with the process of radiation emission.

It is of the essence of the invention to use this time interval $\Delta t$ in which there is negligible loss of energy out of the spark channel, in order to put into it as much energy as possible. The energy input into the spark channel occurs during the electrical breakdown. The basic condition of the invention therefore is that the electrical breakdown must be finished or almost finished before considerable energy is lost out of the spark channel. The time interval available may be more or less than 0.3–0.5 microsecond, probably changing somewhat with the operating conditions, i. e. gas pressure, material, etc.

The mechanism of the spark discharge allows breakdown times as short as $10^{-8}$ seconds and shorter, provided that the constants of the external electrical circuit (outside the spark gap) allow such short times. The resonance frequency of the external circuit is:

(1) $$f = \frac{1}{2\pi}\sqrt{\frac{1}{LC} - \frac{R^2}{4L^2}}$$

Thus, the electrical breakdown (which is shorter than about ½ to ¼ cycle) can only be shorter than 0.5 microsecond, when $f$ is more than about 0.5 megacycle.

The energy fed into the spark channel during the electrical breakdown is about proportional to the capacitor energy which is (2) $$E = \frac{U^2 C}{2}$$

Therefore, the breakdown voltage U and the capacity C must be as large as possible to obtain maximum temperatures. The inductance L however must be as small as possible to keep the breakdown short enough according to Formula 1. The fraction F of the capacitor energy E which actually goes into the channel during the breakdown increases inversely with the inductance but directly with the ohmic resistance of the gap; F was about 30% of E in the former experiments. (H. Fischer and M. Reger, "Time function of the radiation of short sparks," Wright Field Report No. T-TR-1178).

The decribed method may be applied to spark gaps (called also breakdown gaps) of any kind of material no matter if gaseous, liquid or solid. In order to obtain the maximum temperature the density of the matter in the gap between the electrodes must be made as high as possible, which in the case of a gas is accomplished by placing it under high pressure, and the volume of the spark channel during the early part of the discharge must be kept small, which in the case of a solid may be a thin wire. The resistance of the spark channel should be matched to the resistance of the electric circuit so that the resistance in the spark channel is larger than the resistance in the electric circuit during discharge. The resistance in the spark channel increases with the density (in the case of gas) which increases the breakdown voltage and thus increases the capacitor energy expended in the spark channel.

A rough estimate of possible temperatures obtainable is pursued in the following:

In a gas at 100 atmospheres pressure, the initial channel width (H. Fischer and M. Reger, "Time function of the radiation of short sparks," Wright Field Report No. T-TR-1178) will be between 0.1–0.01 cm. With a gap length of 1 cm., the breakdown voltage may be about 100 kv. It should be possible to build a capacitor arrangement with 0.1 microfarad but with an inductance of less than 0.1 microhenry which results in a resonance frequency of $f=1.6$ megacycles, i. e. a breakdown time of less than about 0.31 microsecond as required by the invented method. With these figures, the capacitor energy amounts to 500 wattseconds. With a channel volume of 0.8 times $10^{-2}$ to $10^{-4}$ cm.$^3$ which results from the given figures there results an energy density of about $10^4$ to $10^6$ wattseconds per cm.$^3$, if we assume that 30% of the capacitor energy is fed into the channel. In the simplest case of using hydrogen or deuterium (gases with 1 electron), the approximate temperature T may be estimated by $$(3) \quad T = \frac{2}{3} \frac{F}{2NK} - NV \sim 10^7 \text{ to } 10^9 \text{ degrees Kelvin}$$

Where $N=2.5\times10^{21}$ is the number of atoms per cm.$^3$ and $K=1.38\times10^{-16}$ erg per degree is the Boltzmann constant; NV is the ionization energy. In hydrogen, V is normally assumed to be 18 electron-volts, but may be much lower under the extreme high energy densities which are assumed.

It must be mentioned that similar time lags as used in this present invention also were observed by other investigators, however, with spark discharges of relatively small energy density. In these cases the mechanism which causes the time lag is a quite different one, as explained by the investigators themselves. (F. D. Craggs and W. Hopwood, "Ion concentrations in spark channels in hydrogen," Troc., Phys. Joc. 59, 755, (1946)). Here in the low energy case where the temperatures in the spark channel ranged around 10,000° K. with an ionization degree of not more than 10%, the time lag $\Delta t$ has to do with the time interval which is needed to transfer the energy from fast electrons and ions into thermal and excitation energy of the neutral gas atoms. This effect, as can easily be understood, must disappear if one goes to higher spark energies because the relaxation time becomes extremely short with increasing degrees of ionization. Therefore the observation of time lags in the low energy discharge by other investigators cannot be used as a basis for the present invention.

In the case of a high energy discharge as observed by the inventor and M. Reger (H. Fischer and M. Reger, "Time function of the radiation of short sparks," Wright Field Report No. T-TR-1178) the temperatures obtained at that time may have amounted to about 100,000° K., as estimated by Fruengel (F. Fruengel, Optik 3, 128, 1948)). In this case, the ionization degree was close to 100%, i. e. the time lag of the low energy case already must have become negligible. In the high energy case, the observed time lag $\Delta t$ is mainly caused by "imprisonment" of radiation as theoretically predicted (G. Gamow and E. Teller, "Rate of selective thermonuclear reactions," Phys. Rev. 53, 608 (1938)), because the radiation emitted in the spark channel (as is already known) is mainly so called free-free radiation which is under such conditions so short in wave length that it is absorbed strongly in the boundary layer of the spark channel. This radiation is re-emitted and re-absorbed, thereby slowing down its progress (imprisonment). This effect of radiation diffusion does not disappear with increasing spark energy; this fact means that a measurable time interval $\Delta t$, which may amount to 0.3–0.4 microsecond more or less in which the energy is stored in the spark channel, must exist also in a gas discharge with extremely high energy densities. This, as already pointed out, is the basis of the present invention.

The condition of increasing the gas pressure in the spark channel in order to get the maximum temperature radiation decreases the radiation loss by reason of the decrease in the volume of the spark channel and of the increase in the absorption coefficient of the radiation. Cutting down the time constant of the electric circuit also causes a decrease of the radiation loss.

Referring now to the accompanying drawings:

Fig. 1 is a side elevation, partly in section, of a suitable capacitor arrangement carrying out the process;

Fig. 2 is a fragmentary plan view of the apparatus shown in Fig. 1; and

Fig. 3 is a detailed view taken on the line 3—3 of Fig. 1 in which a section of the capacitor or condenser shown in Fig. 1 as part of the apparatus is illustrated.

The apparatus comprises a spark gap 10 consisting of a pair of electrodes 11 and 12. The gap 10 is inclosed within a high pressure chamber 13 which is made of steel. Either one or both electrodes are insulated with quartz sleeves against the steel chamber. The chamber is provided on one side, that is opposite the gap with a window 14 which is able to resist high temperatures and which is transparent to ultraviolet visible or infra red radiation. Such a material is lithium fluoride. The window is constructed so that its inner surface is of larger extent than its front surface, therefore high pressures cannot eject it from the chamber. A small delivery pipe 15 in which there is a valve 16 supplies hydrogen deuterium, tritium or argon to the interior of the chamber 13 and a second pipe 17 in which there is a valve 18 which serves to conduct the effluent gas from the chamber. The two pipes are inletted into the chamber 13 so that they will not be opposite each other. Pipe 15 is preferably inletted at a higher level than pipe 17.

Electrode 11 is supported by the upper plate 19 of a circular capacitor 20 of high capacity. A lower plate 21 of substantially identical construction with plate 19 supports electrode 12. The space between the upper and lower plates 19 and 21 is occupied with a spirally wound metallic foil element (see Fig. 3) 23 and a spiral di-electric element 24, which may be of varnished paper or suitable type of plastic. As is usual in the building of condensers of this type alternate strips of foil are attached respectively to the upper and to the lower plates, the dielectric being wound between the foil strips. In order that the condenser may have enough capacity to do the work required of it in this process, the diameter of the condenser 20 is approximately 40 centimeters, more or less. The electrodes and spark gap occupy a hollow space 5 to 10 centimeters at the center. Attached to the dielectric opposite the window 14, there is an angled metallic mirror 26, the function of which is to reflect out of the condenser through an opening 27 in the plate 19, the radiation which is generated when the capacitor is discharged through the gap between the electrodes. The mirror 26 is preferably of the kind having a front reflecting surface, which should be preferably of refractory metal such as tungsten.

The condenser 20 is provided with a charging circuit 28 leading from a D. C. power supply 29 and containing a variable resistance. The upper arm 31 is connected to the upper condenser plate 19 at 32. The lower arm 33 is connected to the lower condenser plate 21 at 34. The charging voltage is preferably about 50 kilovolts, but may be as high as desired or necessary.

The pipe 15 leads from a source of molecular gas, namely a tank of deuterium (not shown) under a pressure of 100 pounds p. s. i. up to 100 atm. p. s. i. or even higher depending upon the ability of the chamber 13 to withstand the internal pressure. A pump is of course the equivalent of a tank of gas under pressure. The pipe 17 leads to an evacuated reservoir (not shown), suitable for the storage of helium. The change to helium is, of course, never quite complete.

The chamber shown in Fig. 1 also mounted in such a way that it projects from the capacitor, just enough to be observable, which increases somewhat the inductance of the circuit. Therefore the arrangement shown is the preferred one.

For the purpose of initiating reactions, the apparatus shown in Fig. 1 may have mounted on top of it any sort of apparatus in which the beam emerging from the opening 27 may be utilized. For infra-red signaling, for example, the apparatus could be mounted on insulated gimbals, so that the emergent beam may be directed manually at any target or in any compass direction.

It lies within the purview of this invention to bring about the combination of the gas and the metal which is introduced into the chamber 13 which surrounds the spark gap. One way of performing this reaction has already been stated, namely to vaporize a wire of the desired metal in an atmosphere of the gas with which it is intended that it shall combine. Obviously this method will serve only for the production of small amounts of the reaction produced. If larger amounts are desired, the process must be made continuous which entails the introduction of successive charges of the metal into the spark gap chamber 13 while the supply of effluent gas is time continued. One apparatus suitable for the introduction of small charges of metal is the ordinary high pressure injection pump used to inject fuel into Diesel engine cylinders. Since this is a well known piece of apparatus of which there are many forms, it is not illustrated. The metal which is to be introduced into the spark gap chamber 13 may be injected by such a Diesel injector pump in a more or less colloidal condition. The injector and its motive power must be insulated from ground during operation. Many liquids are suitable for the preparation of a colloidal suspension suitable for injection, i. e. a high flash-point low-viscosity mineral oil, or ethyl alcohol. In general however, oxygen-containing liquids are to be avoided. The injection pump would of course be attached to the inlet pipe 15. In case the suspending liquid is found to be objectionable for any particular reaction, the metal may be blown in by the well known injector effect used in sand blasting apparatus.

The high pressure of the deuterium or hydrogen will be enough to create a considerable injector effect in apparatus built similarly to sand blasting apparatus. Of course the scale of the apparatus must be considerably reduced for laboratory work.

In the chamber 13 a proportion of the metal and the gas will combine. For example, if the injected metal were finely powdered beryllium and the gas deuterium, the effluent form pipe 17 would contain a proportion of beryllium deuteride, likewise if the metal were beryllium and the gas tritium, the product would contain a proportion of beryllium tritide. Of course, the method also serves for the production of ordinary hydrides if ordinary hydrogen is the gas supplied. It is to be observed that the use of pressure for these reactions is not primarily to promote combination of the elements but to reduce the violence of the sound and shock effects which would otherwise occur upon spark discharge. When pressures of the order named are employed, this violence is greatly reduced. If the reaction shows a tendency to be of an explosive nature, undue stress upon the chamber 13 may be minimized by providing a fine hole (not shown) through either the wall of the chamber 13 or the lithium fluoride window. When it is not one of the purposes of the experiment to observe interior of the chamber or to utilize the head which is radiated from it through the window, the window may be dispensed with and the solid wall of the chamber 13 substituted therefor.

It is also possible to use the spark discharge for the activation of gases, for example, argon, which are not activated at the arc temperatures which Langmuir has shown are sufficient to activate ordinary hydrogen.

What I claim is:

1. Apparatus for producing extremely high temperatures comprising; two parallel oppositely disposed metallic plates; a pair of axially aligned electrodes extending toward each other from the inner sides of said plates and forming a spark gap between their free ends; a large capacitor situated in the space between said plates and completely surrounding said electrodes at a minimum distance therefrom, said capacitor consisting of a pair of spirally wound metallic ribbons insulated from each other and situated perpendicular to said plates, one of said ribbons being electrically connected to one of said plates along its entire edge adjacent to said one plate and the other of said ribbons being electrically connected to the other of said plates along its entire edge adjacent to said other plate; a source of voltage exceeding that required to cause break-down of said gap; means for connecting said voltage in series with a resistance between said plates for charging said capacitor to a potential sufficient to produce a spark discharge thereof across said gap; the total resistance of the discharge circuit including said gap being sufficiently low, the portion of said total resistance in that part of the discharge circuit external to said gap being sufficiently low, and the ratio of capacitance to inductance in the discharge circuit being sufficiently high that said spark discharge has a high intensity and a duration less than the interval between the initiation of said discharge and the time of the radiation maximum from the spark channel.

2. Apparatus as claimed in claim 1 in which means are provided for introducing a gas under high pressure in and around the gap between said electrodes.

References Cited in the file of this patent
UNITED STATES PATENTS

| | | |
|---|---|---|
| 2,241,968 | Suits | May 13, 1941 |
| 2,427,339 | Alexander | Sept. 16, 1947 |
| 2,452,139 | Newton | Oct. 26, 1948 |
| 2,543,053 | Parker | Feb. 27, 1951 |
| 2,553,944 | Schlesman | May 22, 1951 |